Jan. 30, 1968 T. C. BARBER 3,365,939
ENGINE WEAR INDICATOR
Filed Dec. 10, 1965 2 Sheets-Sheet 1

INVENTOR.
THEODORE C. BARBER
BY
McLaughlin, Cahill & Drummond
ATTORNEYS 3,365,939
ENGINE WEAR INDICATOR
Theodore C. Barber, Star Route 5,
Winnemucca, Nev. 89445
Filed Dec. 10, 1965, Ser. No. 513,134
1 Claim. (Cl. 73—115)

ABSTRACT OF THE DISCLOSURE

An engine blow-by indicator providing an indication of the rate of flow of blow-by gases from an engine crankcase.

My invention relates to an engine wear indicator, and particularly an indicator which shows when an engine has reached such a state that major repair of its moving parts is required. An ordinary driver will sometimes drive many miles beyond the point where some major repair would be helpful because he has no way of knowing when his engine needs substantial repair except what is told to him by a filling station operator or a mechanic, and even in such cases he does not know whether or not he is being given good advice. The need to determine the amount of wear to which moving parts have been subjected is particularly important when an automobile is being driven very extensively in one's work, when the internal combustion engine is part of a piece of working equipment, when the engine is in a pickup truck which is used daily, or, for example, if the engine is used in a relatively light airplane used for private business purposes. Under existing circumstances, the determination of wear factor is pretty much a matter of "hit or miss" and is dependent to a considerable extent on the good judgment of capable mechanics who may be consulted, or the need of major repair may become very manifest when a breakdown occurs such as the loss by breakage or wear of an oil ring or some part of the piston itself.

A principal object of the present invention is the provision of instrumentation for determining the amount of wear to which an internal combustion engine has been subjected.

Another object is the provision of instrumentation of this character which may be made available for the inspection of an operator at all times during which a vehicle is in operation.

In accordance with the general features of my invention, I utilize pressure built up in the crankcase caused by blow-by around the pistons to actuate an indicator and thus to indicate the amount of wear which has occurred. While the instrument may be disposed in a very simple manner adjacent the block forming a part of the internal combustion engine, suitably it involves the use of a dial instrument which may be mounted on the regular instrument panel and thus available for inspection by the driver. Thus he is always aware of gradually occurring changes, and can take remedial action quickly in the event a sudden change should become manifest.

In the drawings I have shown one embodiment of my invention in which.

Figure 1:
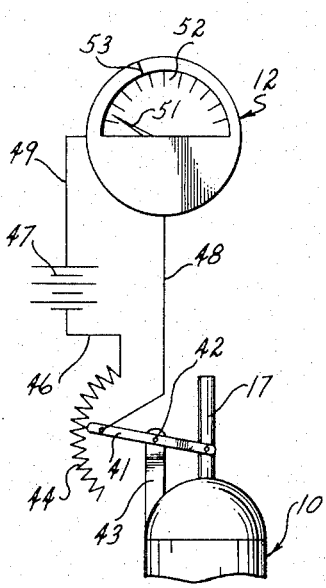
FIG. 1 is a fragmentary view showing schematically the manner in which the engine wear may be indicated on a dial mounted within the view of the operator.
Figure 3:
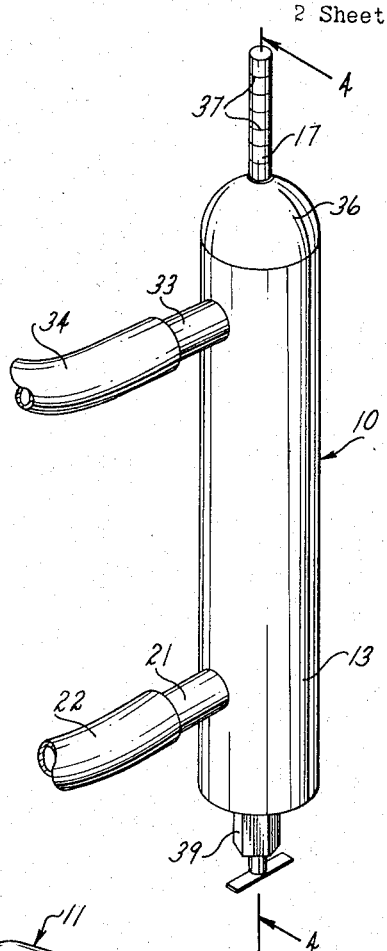
FIG. 3 is an enlarged elevational view showing the instrument removed from the engine block.

Referring now to the drawings, the instrument itself indicated generally by the reference character 10 may be mounted on the side of an engine indicated generally by the reference character 11 or it may be mounted in any suitable position, as indicated in FIG. 1, and an indicator 12 mounted on an instrument panel or some other place removed from the instrument itself made available for the inspection of the driver. While the manometer or equivalent pressure indicating device can be mounted directly on the instrument panel, generally an electrical instrument is preferred when the read-out calibration is at a distance from the engine.

Figure 2:
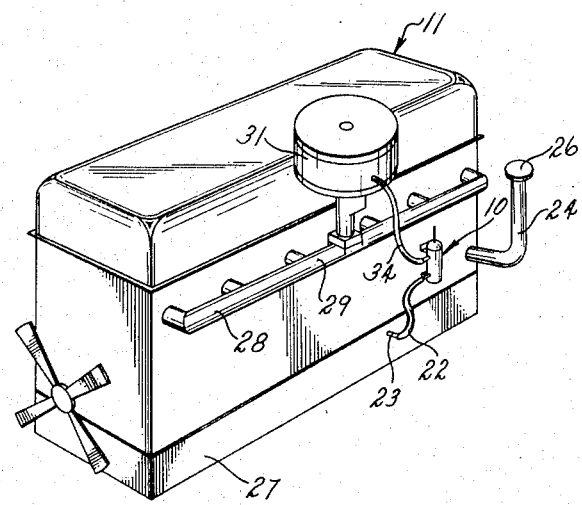
FIG. 2 is an isometric view showing partly schematically an internal combustion engine with the instrument of my invention mounted thereon.
Figure 4:
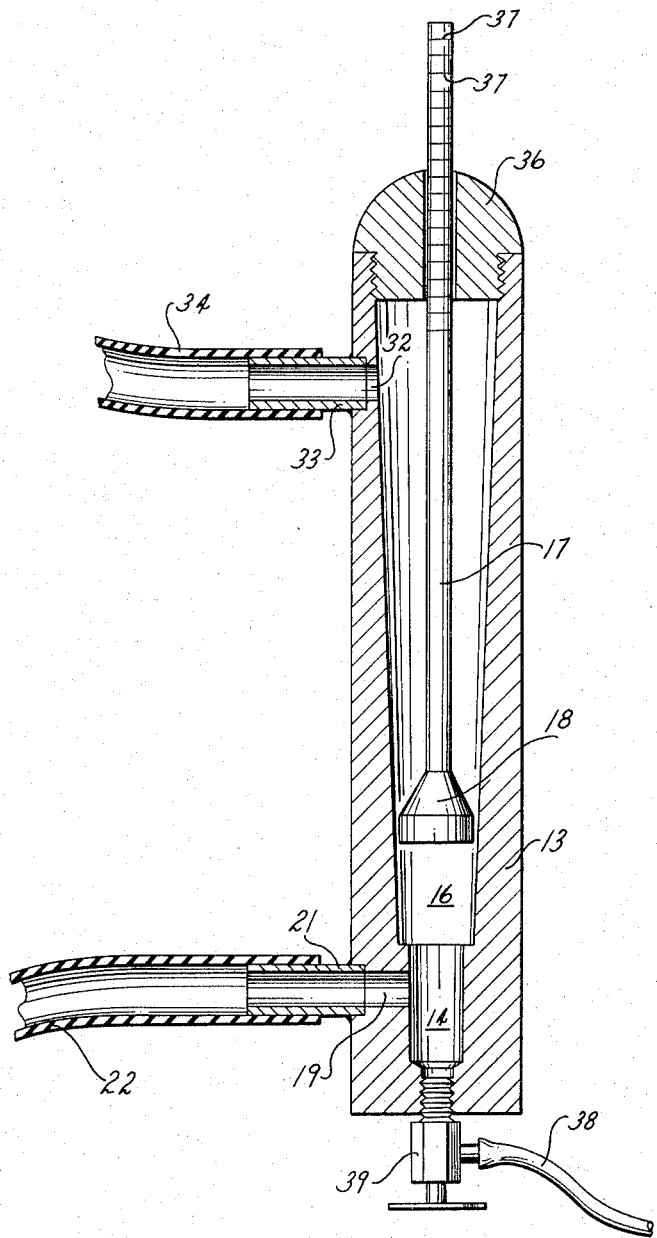
FIG. 4 is a further enlarged fragmentary vertical sectional view taken along the line 4—4 of FIG. 3.

The instrument itself includes a generally tubular base member 13 with a uniform diameter lower opening 14 and an upper tapered opening 16 in which a flowmeter rod 17 is supported from a base 18, a side opening 19 next to a tubulation 21, and a hose 22 which is connected to the tubulation 21 and to a second tube 23 which is in connection with the sump of the engine 11. An oil tube 24 has a filler cap 26 which is sealed, so that the only way in which vapor under pressure can escape from the sump is through tube 22. In the engine shown in FIG. 2, the sump is indicated by the usual pan 27 more or less schematically, and the intake manifold 28 shows a carburetor 29 schematically. A filter 31 leads to the carburetor, so that any vapor brought into the filter will find its way into the carburetor and through the carburetor into the internal combustion engine.

At an upper part of the base portion 13 there is also a radial opening 32 with a tube 33 sealed in the opening and having a flexible tube 34 attached to it, which flexible tube 34 leads to the air filter 31 as already described.

The flowmeter stem 17 extends through a cap 36 which may be formed of suitable heat-resistant, but preferably non-metallic, material as may be available, and the top of the flowmeter stem is provided with graduations 37 which indicate how far the base 18 and the flowmeter stem have been lifted as the engine is running.

It will be noted that the opening 16 is tapered, its diameter diverging upwardly, and for purposes of illustration, this divergent character is partly saturated. In any event, it takes greater pressure to raise the flowmeter base 18, say one inch, than to raise it one-quarter inch, and vice versa. Usually, the difference cannot be expressed as a straight-line function but, rather, a logarithmic function, the exact calibration depending upon the number of factors which need not be gone into in detail here. There is another factor to consider and that is the weight of the flowmeter, it being understood that a lighter material will be raised more readily than a heavier material and, providing for suitable calibration, this of course is taken into consideration.

It is, of course, obvious that predominantly the blow-by vapor consists of hydrocarbon materials (with possibly traces of carbohydrate compounds), either engine lubricant alone, engine fuel alone, or some mixture of the two. There is also a partial breakdown of these materials under heat and pressure so that other vaporous products will also be represented. It will at once be apparent that substantially all of the vaporous materials entering the crankcase of the engine will have to enter the device of the present invention and thence pass into the filter for combustion in the cylinders as they are successively fired. There is, therefore, no atmospheric pollution from this source. It may happen, however, that some heavier fractions of oil may condense in the flowmeter opening 14, and in this case the condensed liquid will drop down to the bottom of the opening 14 and may be drained off through a drainage hose 38 by manipulating a valve 39 which is provided for the purpose.

Many ways may be provided for transmitting information with respect to the operation of the flowmeter to a point at a distance from the engine such as on the instrument panel of an airplane or even an automobile when the possibility of sudden changing in engine conditions is less likely. Such an arrangement is indicated schematically in FIG. 1. Stem 17 is pivoted to one end of a lever 41 which is pivoted at its center 42 to an upwardly projecting rod 43 carried by the cap 36. Member 41 can be one arm of a potentiometer device which traverses a radially shaped resistance 44 pivoted to a conductor 46 in which a battery 47 is inserted. The arm 41 is connected by a conductor 48 to ground as represented by the flowmeter 10, and an extension of the conductor 46, indicated by the reference character 49, is also connected to the calibrated ammeter instrument 12. Any suitably calibrated ammeter with a pointer 51 and scale 52 may be used to show the required information, and in this connection a danger marker 53 may be provided showing that there is enough blow-by that repair of the vehicle is indicated. This condition may not be represented by actual breakage of oil rings in a piston but only gradual extensive wear and the resulting sufficient loss of compression as to make it inadvisable to use the engine further. It is, of course, obvious that if there should be an actual breakage of an oil ring with maximum blow-by of fuel under compression in a cylinder, then there will be a sudden marked rise and the presence of eminent danger will be made known to the driver or operator.

I have described my invention in detail so that those skilled in the art may understand one manner of practicing the same, but the scope of the invention is defined by the claims.

I claim:

1. In combination with a vehicle-mounted internal combustion engine operated by a human operator, said engine having a combustion cylinder,
    a reciprocating piston operating within said cylinder, and
    means defining a gas-tight crankcase enclosing the low-pressure side of said piston-cylinder assembly, an engine wear indicator comprising:

(a) a blow-by gas flowmeter;

(b) indicating means responsive to said flowmeter for continuously indicating the time rate of flow of blow-by gas through said flowmeter, said indicating means being permanently mounted within sight of the operator of said vehicle during the operation thereof;

(c) conduit means communicating between said gas-tight crankcase means and said flowmeter for conducting blow-by combustion gases from said crankcase means to said flowmeter; and (d) conduit means for conducting blow-by gas which has passed through said flowmeter to a point remote from said operator.

References Cited

UNITED STATES PATENTS

| | | | |
|---|---|---|---|
| 1,729,732 | 10/1929 | Wasson | 73—116 X |
| 2,070,375 | 2/1937 | Sherwood | 73—209 |
| 2,211,196 | 8/1940 | Bristow | 73—116 |
| 2,274,086 | 2/1942 | Morrison | 73—116 |
| 3,024,654 | 3/1962 | Head | 73—209 |
| 3,330,248 | 7/1967 | Cornell | 73—116 X |

RICHARD C. QUEISSER, *Primary Examiner.*

J. W. MYRACLE, *Assistant Examiner.*